Jan. 20, 1925.
F. E. ROACH
SPRINKLER DEVICE
Filed Sept. 5, 1919
1,523,608
2 Sheets-Sheet 1
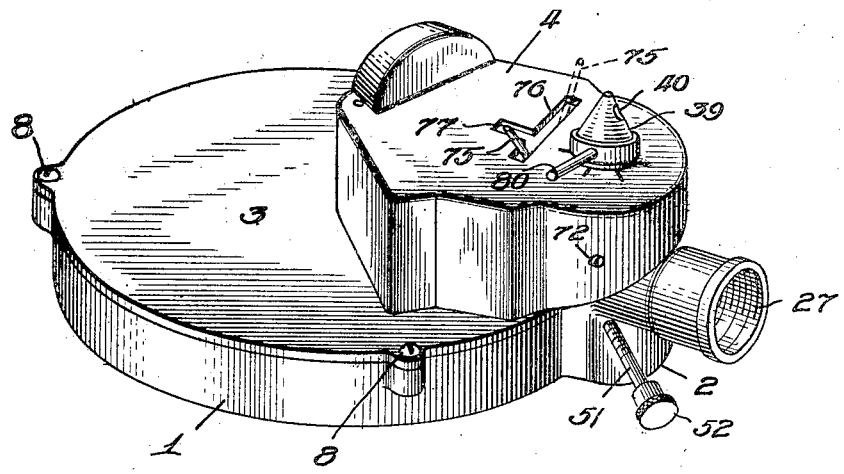
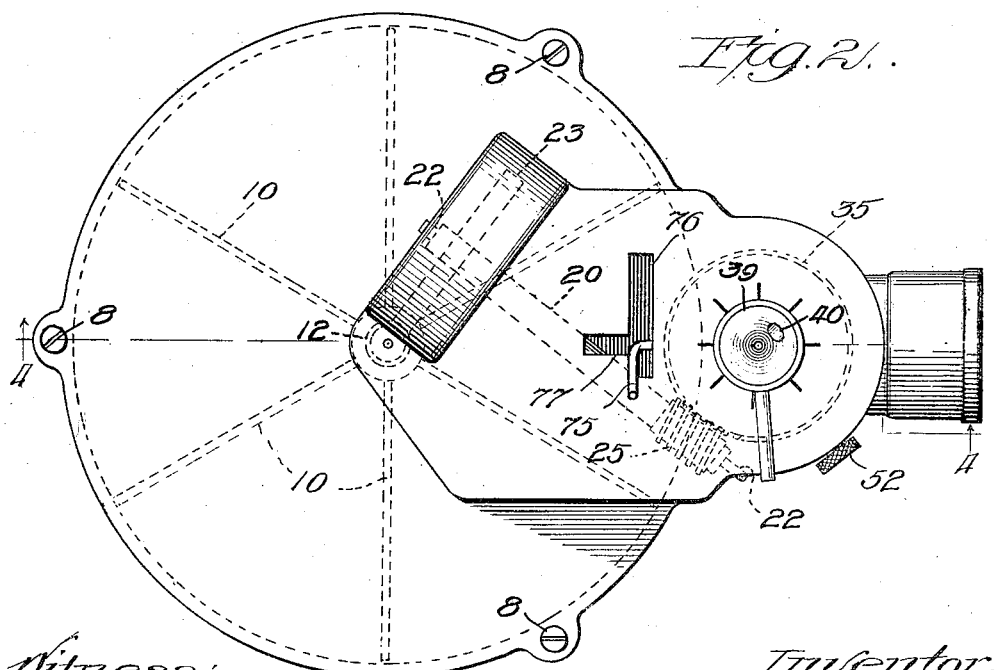

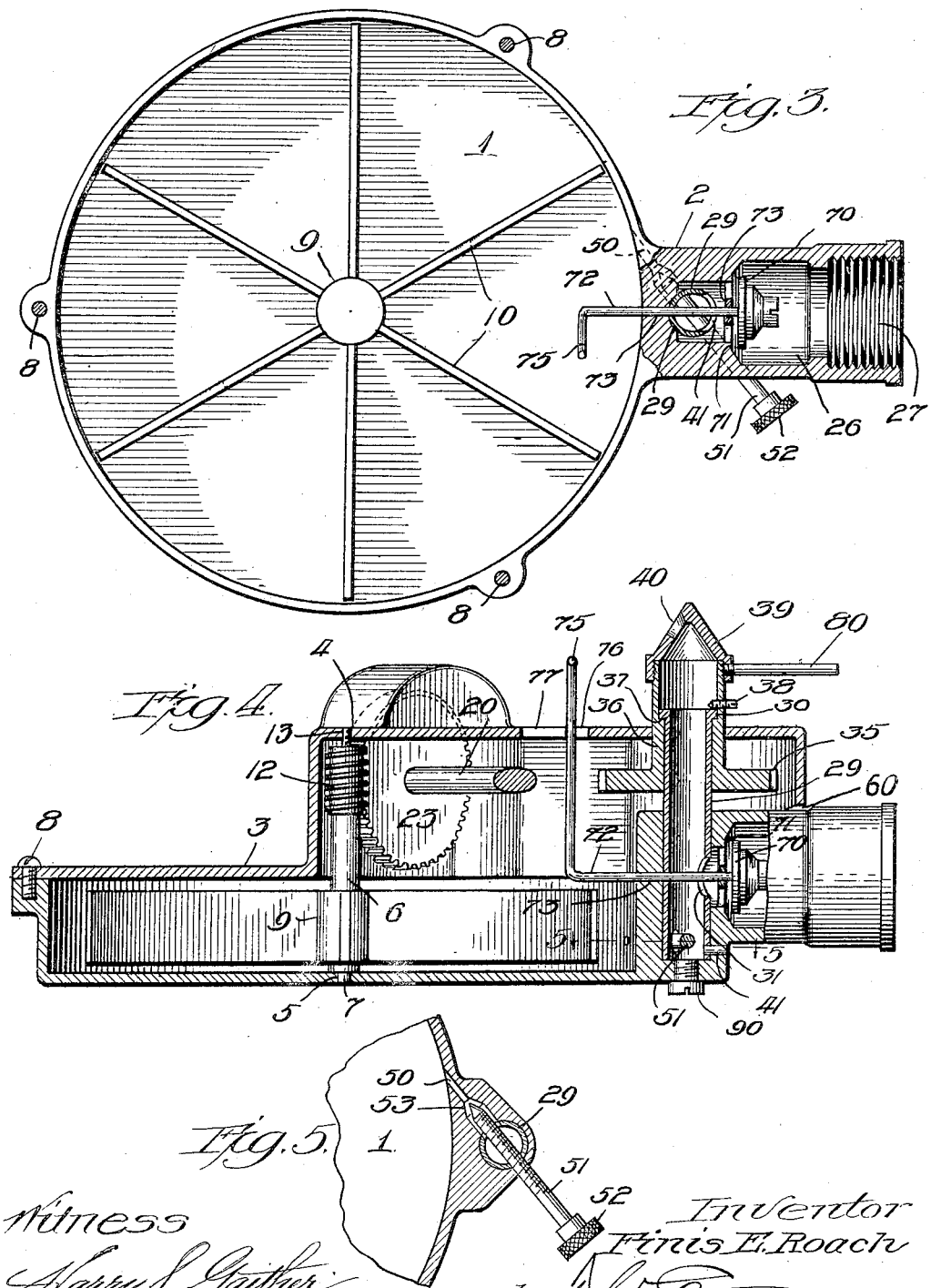

Patented Jan. 20, 1925.

1,523,608

UNITED STATES PATENT OFFICE.

FINIS E. ROACH, OF CHICAGO, ILLINOIS.

SPRINKLER DEVICE.

Application filed September 5, 1919. Serial No. 321,764.

*To all whom it may concern:*

Be it known that I, FINIS E. ROACH, a citizen of the United States, and a resident of Chicago, in the county of Cook and State of Illinois, have invented certain new and useful Improvements in Sprinkler Devices; and I do hereby declare that the following is a full, clear, and exact description thereof, reference being had to the accompanying drawings, and to the letters of reference marked thereon, which form a part of this specification.

This invention relates to improvements in lawn sprinklers, and more particularly, to that class of sprinklers provided with automatic means for the spraying nozzle in order to water a larger area of lawn than would be covered if the nozzle remained stationary. Accordingly, I have provided a lawn sprinkler with means operated by the flow of the water for moving the spraying nozzle in a circle so that a large circular area of lawn may be watered. I have also provided means for adjusting the sprinkler so that the spraying nozzle will move only through a predetermined part of a circle; and upon reaching the end of its travel it automatically stops and shuts off the flow of water.

In addition to the features mentioned above, my improved sprinkler is so designed that it may be made easily and cheaply; and readily assembled and taken apart for cleaning purposes. It is also designed so that it will operate satisfactorily with water carrying a large amount of sediment.

The above mentioned objects of my invention and others will be more readily comprehended as I proceed with my specification.

A device embodying the objects of my invention is illustrated in the accompanying drawings in which:

Figure 1 is a view in perspective of my complete lawn sprinkler.

Figure 2 is a top plan view of the sprinkler.

Figure 3 is a top plan view of the sprinkler with the cover plate removed and a part broken away.

Figure 4 is a vertical sectional view on the line 4—4 of Fig. 2, looking in the direction indicated by the arrows.

Figure 5 is a horizontal sectional view on the line 5—5 of Figure 4, looking in the direction indicated by the arrows.

As shown in said drawings, the sprinkler comprises a casting consisting of a flat circular dish shaped chamber 1, with a radially projecting part 2. These parts are covered by a substantially circular cover plate 3 which has formed integrally with it an enlargement 4 affording a housing for some of the moving parts and a cover for the radially projecting part 2. The cover plate 3 is fastened to the casting of the chamber 1 by means of the screws 8, 8, as shown.

In the center of the chamber 1 is provided a small hole 5 which affords a bearing for the vertically mounted shaft 6, the bottom end of the shaft 6 being reduced in size as indicate by 7, in order to fit into such hole. Near the lower end of the shaft 6, there is provided the hub 9 with six radially extending vanes 10, 10. The vanes 10, 10 are formed of rectangular shaped pieces of thin, stiff metal of sufficient length to extend from the hub 9 nearly to the vertical circular side wall of the chamber 1, and of a width slightly less than the depth of said chamber. The shaft 6 is extended upwardly above the hub 9 and has formed on its upper end, the worm 12. The extreme upper end of the shaft 6 is also reduced in diameter and journaled in a small hole 13 in the housing 4. Horizontally mounted in the housing 4, lying above the vanes 10, 10, is a shaft 20 with its ends 22, 22 reduced in size and journalled in holes provided in such housing. On one end of the shaft 20 is mounted the pinion 23 adapted to mesh with the worm 12 and the other end of the shaft 20 is provided with the worm 25.

The radially projecting part 2, is cored out to form a water inlet, as indicated at 26, for the purpose of admitting water to the sprinkler. At its outer end this inlet 26 is provided with the internal threads 27 for the purpose of affording a connection with the end of a hose or other source of water supply. Near the inner end of radial extension 2, inserted in a vertical hole which meets the inner end of the cored water inlet opening 26 and extending somewhat below said opening, is a tube 29, the upper end of which is provided with a flange 30. The tube 29 is provided near its lower end with a hole 31 opening into the end of the water inlet opening 26. Rotatably mounted on the upper end of the tube 29 is a pinion 35 adapted to mesh with the worm 25 on the end of the shaft 20. The pinion 35 has an upwardly extending sleeve 36 encasing the upper end of the tube 29 and extending upwardly a short distance beyond its end through a hole provided in the housing 4. The interior of this sleeve is enlarged at its upper end, providing the shoulder 37 adapted to engage with the under surface of the flange 30 on the upper end of the tube 29 in order to prevent upward movement of the pinion. The sleeve 36 is also provided with an inwardly extending set screw 38, the inner end of which is adapted to engage with the upper side of the flange 30 in order to prevent downward movement of the pinion 35. Threaded on to the upper end of the sleeve 36 is the spraying nozzle 39, which is preferably conical in shape and is provided near its apex with the upwardly inclined water spray outlet 40. The outlet 40, I have shown tapered in order to form the issuing stream of water into a spray but it is obvious that this opening may be made in a variety of shapes. The tube 29 is held in place by the pin 41 at its lower end.

It will be manifest that rotation of the shaft 6 will rotate the worm 12, the pinion 23, the shaft 20, the worm 25, and the pinion 35, thus rotating the spraying nozzle 39 causing the stream or spray issuing from the outlet 40 to water a large circular area of ground.

I will now describe the means I have provided for rotating said shaft 6. As stated before, the shaft 6 is provided with a hub 9, and radially projecting vanes 10, 10 lying in the dish shaped chamber 1 of the sprinkler. Entering this chamber 1 tangentially, is a small circular port 50 of restricted cross sectional area, as compared with the water supply inlet 26. This port 50 connects the bottom of the vertical hole provided in the radially projecting part 2 in which the tube 29 is inserted with the water chamber 1, a corresponding hole being provided in the tube 29 near its bottom end. The port 50 is controlled by a needle valve, the threaded stem of which is indicated by 51 and the milled handle at the end thereof by 52. The port 50 is enlarged from its center to the end nearer the tube 29 in order to provide a seat 53 for the end of the stem 51 of the needle valve and to permit the passage of water around such stem when the end is not screwed down against the seat 53.

It is obvious that water passing through the inlet opening 26 in the radially projecting part 2 will enter the hole 31 in the tube 29, the greater part thereof passing upward through such tube into the spraying nozzle 39 and out through the outlet 40. It is also obvious that some of the water entering the tube 29 will pass through the port 50, when the needle valve 51 is open, entering tangentially the chamber 1 of the sprinkler and impinging against the ends of the vanes 10, 10, thereby causing the hub 9 and the shaft 6 to rotate. When the chamber 1 of the sprinkler becomes full of water the stream of water entering through the port 50 tangentially will still impinge against the ends of the vanes 10, 10 to a certain extent and will also cause the body of water in the chamber 1 to rotate, thus continuing the rotary movement of the vanes 10, 10 and the resulting rotation of the shaft 6. The housing 4 is somewhat loosely fitted around the projecting part 2 in order to leave the opening 60 for the escape of waste water from the chamber 1.

I have also provided means which may be used, if desired, for automatically stopping the rotation of the spraying nozzle at a predetermined point and shutting off the water. Such means comprise a valve arranged in the inner end of the water inlet opening 26 consisting of the valve disc 70 adapted to seat by pressure of the inflowing water on a seat 71 formed near the inner end of the inlet opening 26. The disc 70 is mounted on the end of a rod or stem 72 which is adapted to slide in the spider 73 mounted at the extreme inner end of the water inlet opening 26, and a hole extending from the chamber 1 outwardly through the part 2 and meeting a corresponding hole in the tube 29. The inner end of the stem 72 is bent upwardly with its end 75 extending out through a T shaped slot in the top of the housing 4. The cross slot of this T shaped slot is indicated by 76 and the slot meeting it at right angles by 77. The stem 72 is of such length that when its end 75 lies in the slot 76 as shown by the solid and dotted lines in Fig. 1 or in any part of the slot 76, the valve disc 70 is held off of its seat and the valve is open to permit the inflow of the water. The slot 77, however, meeting the slot 76 at right angles is of such length that when the end 75 of the valve stem is opposite its open part where it joins the slot 76, the valve stem 72, due to the pressure of water on the disc 70 moves inwardly a sufficient distance to allow the disc 70 to seat and cut off the flow of water. It is obvious that the inflowing current of water will continually exert pressure on the disc 70, which pressure will be transmitted through the stem 72 to the end 75, causing said end to bear against the side of the slot 76 at which the slot 77 enters. It is obvious also that since the slots 76 and 77 communicate with each other, that when the end 75 of the stem is at any point in the slot 76 not opposite the opening of the slot 77, the pressure of the water on the valve disc can not cause it to enter the slot 77. If, however, the end 75 of the stem is moved through the slot 76 until it comes opposite the open or communicating end of the slot 77, the pressure of the water on the disc, as above described, will immediately cause the stem 75 to enter the slot 77 thus allowing the disc to seat and shut off the inflow of water to the tube 29. I have provided the following means for moving the end 75 of the valve stem through the slot 76 to bring it opposite the opening of the slot 77 in order to shut off the water and stop the spray as described above.

Such means comprise a pin 80 extending radially from the spraying nozzle 39 and of such length as to contact with the end 75 of the stem 72, when the nozzle rotates and moves the latter lengthwise in the slot 76. The slot 76 is so arranged that such engagement and continued rotation of the nozzle 39 will move the end 75 of the stem 72 from the end of the slot where it is shown in solid lines in Figure 1 toward the opposite end of such slot until it comes opposite the opening of the slot 77 whereupon it will enter said slot allowing the water to be shut off as described above.

Since the nozzle 39 is threaded on the end of the sleeve 36, a certain amount of rotation of this nozzle on the sleeve 36 is afforded which will permit the setting of the pin 80 in any desired position so that its engagement with the end 75 of the valve stem may be caused to take place after the nozzle has rotated a predetermined distance.

I have made the slot 76 of such length that when the end 75 of the valve stem is set at its end as indicated by dotted lines in Fig. 1, it is a sufficient distance from the rotating nozzle 39 so that it will not be engaged by the end of the pin 80. It is obvious, therefore, that when in this position the nozzle 39 will rotate continually, and a spray of water in a circular path be continuously given out.

It will be noted that the worms and pinions connecting the shaft 6 with the rotating nozzle 39 are of such ratios that the nozzle will rotate very slowly. As shown, they are of such ratios that with the ordinary flow of water, the nozzle 39 will make a complete rotation in about one hour. It is obvious, however, that the ratios may be varied in order to increase or diminish the speed of rotation of the nozzle without detracting from the spirit of my invention. It is obvious also that as shown, certain variations of speed in the rotation of the nozzle 39 may be made by adjustment of the needle valve 51 with consequent regulation of the amount and velocity of flow of water through the port 50.

At the bottom of the vertical hole in the radially projecting part 2 in which is inserted the tube 29, I have provided a screw plug 90 which is adapted to be removed for cleaning purposes.

It is obvious that water with a considerable amount of sediment will not interfere with the operation of the device since the rotation of the vanes 10, 10 will cause sufficient disturbance of the water in chamber 1, to keep any sediment in suspension and permit it to flow off with the waste water through the discharge outlet 60. The circulation of waste water through the housing 4 and by the worms 12 and 25 and the pinions 23 and 35 will also operate to keep the engaging and moving parts free from sediment and permit their easy operation.

My device is cheap to manufacture, does not readily get out of order, and lies flat on the ground, so that the weight of the water in the chamber 1 counteracts any tendency to shift its placed position. While I have shown a preferred form of construction, it is obvious that modifications may be made without departing from the scope of my invention. I do not, therefore, intend that my invention be limited in scope except as indicated in the appended claims.

I claim as my invention:

1. In a lawn sprinkler, a rotatable nozzle, a chamber provided with radially disposed, rotatable vanes, an inlet connection from a source of water supply, a valve in the inlet, means for supplying water from the inlet to the nozzle, means for closing the inlet valve, and means operated by the rotation of said nozzle for automatically actuating said valve closing means.

2. In a lawn sprinkler, a flat housing having an interior chamber and radially disposed vanes mounted to rotate therein, a radial projection integral with the housing having an interior valved inlet adapted to be connected with a source of water supply, said valve being normally closed, means for opening the valve, means for supplying water from the inlet to the vane chamber, a rotatable water nozzle operatively connected with the rotating vanes and with said water inlet, and means operated by said nozzle for closing said valve.

3. In a lawn sprinkler, a housing provided with an interior vane chamber, a valved water inlet and a water conduit connecting the inlet with the chamber, a rotatable spray nozzle operatively connected intermediate the inlet and the vane chamber, rotatable vanes in said chamber operatively connected with the nozzle, means for opening the valve against the pressure of the inflowing water, also means for locking said opening means to retain the valve in its opened position and means controlled by the rotation of said nozzle for releasing said locking means.

4. In a lawn sprinkler, a housing provided with an interior vane chamber, a valved water inlet and a water conduit connecting the inlet with the chamber, a rotatable spray nozzle operatively connected intermediate the inlet and the vane chamber, rotatable vanes in said chamber operatively connected with the nozzle and means for opening the valve against the pressure of the inflowing water, also means for locking said opening means to retain the valve in its opened position, including a slot through the chamber and a movable rod projecting there through and connected at its lower end to the valve and means controlled by the rotation of said nozzle for releasing said locking means.

5. In a lawn sprinkler, a housing provided with an interior vane chamber, a valved water inlet and a water conduit connecting the inlet with the chamber, a rotatable spray nozzle operatively connected intermediate the inlet and the vane chamber, rotatable vanes in said chamber operatively connected with the nozzle and means for opening the valve against the pressure of the inflowing water and also means associated with said nozzle for disengaging said opening means to permit the closing of the valve by the pressure of the inflowing water.

6. In a lawn sprinkler, a housing provided with an interior vane chamber, a valved water inlet and a water conduit connecting the inlet with the chamber, a rotatable spray nozzle operatively connected intermediate the inlet and the vane chamber, rotatable vanes in said chamber operatively connected with the nozzle and means for operating the valve against the pressure of the inflowing water and also means for disengaging said opening means to permit the closing of the valve by the pressure of the inflowing water, said disengaging means being operatively mounted upon the nozzle.

7. In a lawn sprinkler, a housing provided with an interior vane chamber, a valved water inlet and a water conduit connecting the inlet with the chamber, a rotatable spray nozzle operatively connected intermediate the inlet and vane chamber, rotatable vanes in said chamber operatively connected with the nozzle and means for opening the valve against the pressure of the inflowing water and also means operated by said motor for disengaging said opening means to permit the closing of the valve by the pressure of the inflowing water, said disengaging means including a rod secured at one end to the valve and having its other end projecting through the vane chamber, said rod having a movement in the direction of the axis of the valve and a movement transverse thereto.

8. In a lawn sprinkler, a housing provided with an interior vane chamber, a valved water inlet chamber, a water conduit connecting the inlet and the vane chamber, and with an overflow outlet, rotatable vanes in the vane chamber, a rotatable nozzle operatively connected with the inlet chamber and with the rotatable vanes, means for opening the valve against the pressure of the inflowing water, and means controlled by said rotating vanes for permitting the closure of said valve.

9. In a lawn sprinkler, a housing provided with an interior vane chamber, a valved water inlet chamber, a water conduit connecting the inlet and vane chambers, and with an overflow outlet, rotatable vanes in the vane chamber, a rotatable nozzle operatively connected with the inlet chamber and with the rotatable vanes, means for opening the valve against the pressure of the inflowing water, and means controlled by said rotatable vanes for causing the closure of said valve.

10. In a lawn sprinkler, a housing provided with an interior vane chamber, a valved water inlet chamber, a water conduit connecting the inlet and vane chambers, and with an overflow outlet, rotatable vanes in the vane chamber, a rotatable nozzle operatively connected with the inlet chamber and with the rotatable vanes, means for opening the valve against the pressure of the inflowing water, and also means actuated by the rotation of said nozzle for releasing the valve opening means.

11. In a lawn sprinkler, a housing with an interior vane chamber, an inlet chamber, a valve arranged to be closed by the pressure of water in said inlet, a water conduit connecting the inlet and vane chambers, and with an overflow outlet, rotatable vanes in the vane chamber, a rotatable nozzle operatively connected with the inlet chamber and with the rotatable vanes, means for opening the valve against the pressure of the inflowing water, said housing being provided with a T shaped slot through its top wall and a rod projecting there through and operatively connecting with the valve stem, and means operated by said vanes for actuating said rod to release said valve..

12. In a lawn sprinkler, a housing provided with an interior vane chamber, a valved water inlet chamber, a water conduit connecting the inlet and vane chambers, and with an overflow outlet, rotatable vanes in the vane chamber, a rotatable nozzle operatively connected with the inlet chamber and with the rotatable vanes, means for opening the valve against the pressure of the inflowing water and means for regulating the flow of water to the vane chamber when the valve is open, said housing being provided with a T shaped slot through its top wall and a rod projecting there through and operatively connecting with the valve stem, and means associated with the rotatable nozzle adapted to actuate said rod.

13. In a lawn sprinkler, a circular water chamber, a rotatable vane therein, a water supply inlet, a valve therein adapted to be closed by the pressure of the inflowing water, means for opening the valve, a rotatable spray nozzle in communication with the supply inlet when the valve is open, operative connections between the vane and the nozzle, a tangential water inlet affording means for conveying water to the water chamber when the valve is open, means for regulating the supply of water through the tangential inlet, means for locking the valve in its open position and means on the nozzle for releasing the locking means to automatically close the valve by the pressure of the water from the source of supply.

In testimony, that I claim the foregoing as my invention I affix my signature in the presence of two witnesses, this 2nd day of September, A. D. 1919.

FINIS E. ROACH.

Witnesses:
B. L. MACGREGOR,
E. A. KRULEWICH.